Patented Mar. 6, 1945

2,370,962

UNITED STATES PATENT OFFICE 2,370,962

FILM-FORMING COMPOSITIONS

Leo Philip Hubbuch, Springfield, and Paul Robinson, Llanerch, Pa., assignors to E. I. du Pont de Nemours & Company, Wilmington, Del., a corporation of Delaware No Drawing. Application February 2, 1942, Serial No. 429,338

8 Claims. (Cl. 260—22)

This invention relates to film-forming materials and more particularly to improved modified drying oils and resinous products.

The oil modified resins of the polyhydric alcohol-polybasic acid type, also referred to as alkyd resins, which have been most widely used heretofore are those obtained by reacting phthalic acid or anhydride, glycerol and a drying oil or drying oil acid, the usual procedure being to react first the glycerol with a drying oil and then react the resulting mono- or di-glyceride or mixtures thereof, with the phthalic anhydride. The products obtained are usually referred to as oil modified resins although they may be regarded as modified drying oils, particularly in the case of the less viscous products obtained by using relatively large amounts of the fatty oil component.

It has been proposed heretofore to replace the phthalic anhydride with maleic, fumaric or other alpha-beta unsaturated dicarboxylic acid. The products previously obtained, however, have been unsatisfactory in several respects, and the substitution has not been generally practical, particularly where it is desired to produce fatty oil modified polyhydric alcohol-polycarboxylic acid resins since the reaction mass gels very early in the cooking process before the desired degree of esterification has been attained and only products of high viscosity can be obtained. In many instances where the reactants are heated at reacting temperatures the mass separates into two layers which do not fuse to form a homogeneous product even on prolonged heating.

The unsatisfactory results referred to above have been due apparently to the failure to recognize that maleic acid or anhydride and similar unsaturated dibasic acids or anhydrides can, under the conditions commonly employed, enter into the polymerization reaction through their unsaturated linkages. The abnormal behavior of maleic anhydride and similar unsaturated acids in such reactions as described above is due to the fact that this acid not only increases the average molecular size in the reaction mass through the usual esterification reaction, but also undergoes a secondary reaction of polymerization, either with itself or with the double bonds of the fatty oil ingredients which are present in the mixture. This secondary reaction increases the molecular size so rapidly that undesirably high viscosities are obtained. Under certain conditions this polymerization of the alpha-beta unsaturated dicarboxylic acid takes place so rapidly that gelation occurs before a satisfactory degree of esterification has taken place. The incompletely esterified product so formed is water sensitive and reactive toward basic pigments. It is not, therefore, a practical material for general use in the formulation of decorative and protective coating compositions.

This invention has as an object improved esters or glycerides of polyhydric alcohols with monobasic acid and poly-basic acid which consists of or comprises in substantial amount an alpha-beta unsaturated dicarboxylic acid. A further object is the manufacture of improved fatty oil modified alkyd resins and modified drying oils. A further object is the production of new and useful coating composiitons. A still further object resides in a method for obtaining the above mentioned products.

The foregoing objects are accomplished by reacting an alpha-beta unsaturated discarboxylic acid with a polyhydric alcohol of more than two hydroxyl groups partially acylated with monobasic acid under the following closely controlled three conditions wherein the unsaturated alpha-beta dicarboxylic acid is present in amount less than 20% of the reaction mixture composed of said unsaturated acid and acylated polyhydric alcohol, the reaction temperature is kept below 180° C., the extraneous polymerizing action from sources such as oxygen from the air is avoided or minimized by blanketing the reaction mass with an inert fluid such as $CO_2$ or with an inert liquid solvent added to the reaction mass, and the reaction is continued, usually not less than 15 hours, until a substantial proportion of the alpha-beta dicarboxylic acid has reacted by esterification or until there is at least an 80% reduction in the acidity of the original reactants, this acidity (or acid number) being defined as the milligrams of potassium hydroxide required to neutralize the acid in one gram of the composite mixture.

The polyhydric alcohol can be partially acylated with monobasic acid only or with a mixture of monobasic acid and polybasic acid such as phthalic. In either case the alpha-beta unsaturated dicarboxylic acid should be reacted with the glyceride in an amount which based on the total weight of the partial ester and unsaturated dicarboxylic acid is less then 20% but which is in such substantial amount, usually at least 15%, that will contribute the desired properties of faster drying, improved hardness and other desirable film characteristics. It is preferred that the alpha-beta unsaturated dicarboxylic acid constitute essentially the sole polybasic acid used and that if phthalic or similar polybasic acids be used the amount be less than 5% by weight of the reaction mixture. The preferred products are those obtained from reaction mixtures composed of from 80% to 90% of drying oil glyceride and 20% to 10% of the alpha-beta unsaturated dicarboxylic acid glyceride.

The invention is further illustrated by the following examples in which the parts are by weight:

Example I

Into a large flask or kettle, fitted, in the manner shown in U. S. Patent 2,057,766, with a thermometer, stirrer and separator (for collecting the distillate with subsequent separation of the non-aqueous portion and return of this portion to the reaction mixture), and topped by a reflux condenser, are placed 2400 parts of soya bean oil and 266 parts of dynamite grade glycerine. The mixture is heated with stirring and when the temperature reaches approximately 125° C. 1.5 parts of litharge are added. The temperature of the reaction mass is raised to approximately 240° C. and the heating continued for .5-1 hour or until the glycerine has completely combined with the oil. This may be determined by the solubility of the material in methanol which should be 1 part of the glyceride in 1.5 parts by volume of hot methanol with a resulting clear solution. At this point the intermediate glyceride is cooled to approximately 165° C. and 416 parts of maleic anhydride and 410 parts of toluene added. The reaction mass is maintained at refluxing temperature (145°-160° C.) for approximately 23 hours. During this portion of the procedure approximately 58-60 parts of water are liberated and the acid number of the reaction mass falls to approximately 17.8. Sufficient toluene is then added to the product to bring the solids content to approximately 85%. This finished product has a viscosity of 6.27 poises, color of 3.0 (Gardner-Holdt scale) and an acid number of 16.7. A dilute solution of this product to which has been added cobalt naphthenate drier in amount of 0.1% cobalt on the basis of the solids produces a film that dries essentially dust-free in about 1¾ hours and essentially tack-free in about 2¾ hours and which after an overnight dry possesses only a slight amount of tack and relatively good hardness.

Repetition of the foregoing example using a somewhat smaller proportion of maleic anhydride, namely, about 10.2% of the reacting material as compared to 13.5% in Example I, yields a product forming a film which dries tack-free in 5¼ hours and which after overnight drying possesses the properties of the film obtained according to the preceding example.

Example II

In accordance with this example the product of the invention is obtained in the absence of an organic solvent by the following procedure: Into the reaction vessel of the equipment previously described are placed 5400 parts of soya bean oil and 266 parts of dynamite glycerine. The mixture is then stirred and heated and when the temperature reaches approximately 125° C. 2 parts of litharge are added. The heating is continued until the temperature reaches about 240° C. and the mass maintained at this temperature for from approximately ¾ to 1¼ hours or until the glycerine has completely combined with the oil which may be determined as previously described. The intermediate glyceride is then cooled to about 165° C. and 416 parts of maleic anhydride added. The mass is maintained at a temperature of approximately 160° C. for about 18½ hours after which time an inert gas (as $CO_2$) is blown through the reaction mass at a moderate rate to facilitate further esterification. The heating and blowing with the inert gas is continued at about 160° C. for an additional 12½ hours during which time the acid number of the product in the reaction vessel reaches about 14.8. This product without further dilution with e. g., toluene, has a viscosity of 6.9 poises, a color of 3.8 (Gardner-Holdt scale) and weighs 8.03 pounds per gallon. Diluted to 85% solids content with toluene the product has a viscosity of 1.29 poises. A solution of the product to which has been added cobalt naphthenate as a drier produces a film which dries essentially dust-free in about 2¼ hours and essentially tack-free in about 5¼ hours. On overnight drying the film possesses a relatively slight amount of tack but relatively satisfactory hardness.

Example III

In this example linseed oil is used instead of soya bean oil in preparing the modified oil or resinous product. Into the reaction vessel is charged 2550 parts of linseed oil and 199 parts of dynamite grade glycerine and the mixture stirred and heated. When the temperature reaches about 125° C. 1 part of litharge is added and the heating continued until the temperature reaches about 240° C. This temperature is maintained for from ¾ to 1¼ hours or until the glycerine has combined with the oil which may be determined as previously described. The intermediate glyceride is then cooled to about 165° C. and 312 parts of maleic anhydride and 400 parts of toluene added and the mass heated at refluxing temperature (145°-160° C.) for approximately 22½ hours. During the refluxing approximately 36-38 parts of water are liberated and removed from the reaction mass and the acid number is about 17. When diluted to a solids content of 85% with toluene the product has a viscosity of 3.29 poises, a color of 3.0, a titrated acid number of 15.4, and weighs 8.11 pounds per gallon. When drier is added to a solution of the products as previously noted it produces a film that dries essentially dust-free in approximately 1 hour and essentially tack-free in approximately 2 hours. After an overnight dry the film possesses a relatively slight amount of tack and relatively good hardness. Compared to the corresponding soya bean oil product of Example II the product of this example has a slightly higher body at a given acid number, dries in a shorter time and is freer from tack after an overnight dry and possesses approximately the same hardness.

Alpha-beta unsaturated dicarboxylic acids that can be used in place of maleic and fumaric acids include diacetylene dicarboxylic acid, itaconic acid, citraconic acid, chloro maleic acid, $\Delta 2:5$ dihydroterephthalic acid, and $\Delta 3:5$ dihydrophthalic acid. It is to be understood that mention herein of these acids is intended to include also their anhydrides.

Unsaturated fatty oils other than those mentioned in the examples that can be used in the practice of this invention comprise hempseed, cottonseed, safflower, dehydrated castor oil, etc. The advantages of the present invention, however, are most apparent where such oils are used which in themselves dry rather slowly.

Although the reaction proceeds appreciably at temperatures as low as 100° C., it is desirable in order to avoid impractically long times of reaction to use a temperature of at least 140° C. The best results are obtained within the range of 155° C. to 165° C.

Conventional inhibitors can be used as a means of further reducing the undesirable polymerizing tendency of the unsaturated dicarboxylic acids but their use is not preferred due to the difficulty of removing them after the esterified product is obtained.

The present products are preferably prepared in a non-reactive organic solvent medium since under such conditions the temperature of the reaction mass is more readily controlled and local superheating more easily avoided. Suitable non-reactive solvents other than toluene are benzene, xylene, and various liquid petroleum hydrocarbons.

The modified oils and resinous products described herein possess markedly improved hardening characteristics when compared to the presently available products in the same viscosity range. Thus when Example I is repeated using the usual reaction procedure of heating the reaction mass at the elevated temperature of 225° C. for 1½ hours, the film obtained after the same addition of toluene and cobalt drier requires about thirty per cent more time to dry dust-free and more than twice the time to dry essentially tack-free. After overnight drying the film possesses much greater aftertack and much poorer hardness than does the film obtained according to the procedure of Example I. Because of the fast drying hard durable films obtained, the products of this invention are valuable substitutes for China-wood oil.

The products obtained by the present process are applicable, with or without the addition of pigments, fillers, dyes, etc., for use as the film forming ingredient in decorative and protective coating compositions substantially as prepared. They may be further combined for use in such coating compositions with other film forming materials as natural or synthetic resins, cellulose derivatives as the esters and ethers, various plasticizers and softeners, etc. They are particularly satisfactory as modifiers for ethyl cellulose. Protective and decorative compositions prepared from the products herein described may be used for coating or impregnating various types of materials, as adhesives, as toughening and waterproofing agents for paper, wood, textiles, stone and similar materials, etc. The products are particularly applicable for use in film forming compositions designed or formulated for use in place of those containing China-wood oil.

As many apparently widely different embodiments of this invention may be made without departing from the spirit and scope thereof, it is to be understood that we do not limit ourselves to the specific embodiments thereof except as defined in the appended claims.

We claim:

1. A process for preparing a fast drying film-forming composition of acid number not above 16.7, said process comprising heating to a temperature of from 140° C. to 165° C. reacting ingredients consisting essentially of a polyhydric alcohol of more than two hydroxyl groups partially acylated with fatty oil acid, and an alpha-beta unsaturated dicarboxylic acid in amount of from 15% to 20% of the total weight of said ingredients, blanketing the reaction mixture during said heating with an inert fluid, and continuing the reaction with said heating and blanketing until a product having said acid number is obtained.

2. The process set forth in claim 1 in which said fatty oil is drying oil.

3. The process set forth in claim 1 in which said unsaturated dicarboxylic acid is maleic acid.

4. A process for preparing a fast drying film-forming composition of acid number not above 16.7, said process comprising heating to a temperature of from 140° C. to 165° C. reacting ingredients consisting essentially of the partial glyceride of soya bean oil acids, and maleic acid in an amount of from 15% to 20% of the total weight of said ingredients, blanketing the reaction mixture during said heating with an inert fluid, and continuing the reaction with said heating and blanketing until a product having said acid number is obtained.

5. A process for preparing a fast drying film-forming composition of acid number not above 16.7, said process comprising heating to a temperature of from 140° C. to 165° C., reacting ingredients consisting essentially of the partial glyceride of linseed oil acids, and maleic acid in an amount of from 15% to 20% of the total weight of said ingredients, blanketing the reaction mixture during said heating with an inert fluid, and continuing the reaction with said heating and blanketing until a product having said acid number is obtained.

6. A film-forming composition of acid number below 16.7 which yields fast drying, hard, durable films, and which is obtained by the process set forth in claim 1.

7. A film-forming composition of acid number below 16.7 which yields fast drying, hard, durable films, and which is obtained by the process set forth in claim 4.

8. A film-forming composition of acid number below 16.7 which yields fast drying, hard, durable films, and which is obtained by the process set forth in claim 5.

LEO PHILIP HUBBUCH.
PAUL ROBINSON.